Figure 1:
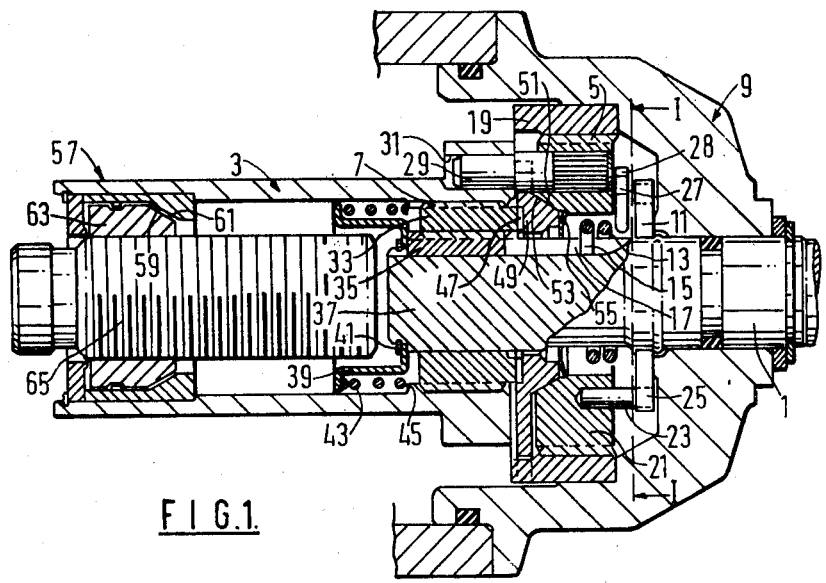

United States Patent [19]

Heibel

[11] 4,392,558
[45] Jul. 12, 1983

[54] ACTUATOR MECHANISMS FOR VEHICLE BRAKES

[75] Inventor: Helmut Heibel, Moschheim, Fed. Rep. of Germany

[73] Assignee: Lucas Industries Limited, Birmingham, England

[21] Appl. No.: 251,706

[22] Filed: Apr. 6, 1981

[30] Foreign Application Priority Data

Apr. 22, 1980 [GB] United Kingdom ............... 8013192

[51] Int. Cl.³ .......................................... F16D 65/30
[52] U.S. Cl. ................................. 188/72.7; 188/325; 188/348
[58] Field of Search .................. 188/72.1, 72.7, 72.9, 188/162, 196 D, 325, 343, 347, 348

[56] References Cited

U.S. PATENT DOCUMENTS 3,757,906 9/1973 Baezold ........................ 188/196 D
4,022,300 5/1977 Afanador et al. ................ 188/72.1

*Primary Examiner*—Duane A. Reger
*Attorney, Agent, or Firm*—Scrivener, Clarke, Scrivener and Johnson

[57] ABSTRACT

The present invention provides an actuator mechanism comprising an axially rotatable actuator shaft and an actuator member which, in use, can be moved axially to actuate a brake. The actuator shaft and actuator member are interconnected by an assembly which comprises a first fast thread and a second fast thread. The first fast thread has a greater pitch angle than said second fast thread and is arranged to, in use, move the actuator member to take up any slack to cause friction surfaces of the brake to interengage. Said second thread subsequently moves the actuator member to apply the brake. By this arrangement the advantages of the two types of fast thread are utilized, the first fast thread quickly taking up the shock and the second fast thread being capable of applying the brake.

10 Claims, 5 Drawing Figures

ACTUATOR MECHANISMS FOR VEHICLE BRAKES

DESCRIPTION

The present invention relates to an actuator mechanism for a vehicle brake.

In particular the present invention relates to an actuator mechanism which could be applied to either disc brakes or drum brakes which are, in particular, for use in commercial vehicles.

In designing, for example, disc brakes for commercial vehicles there is a limitation to the applying force and travel of the actuator mechanism. Where hydraulic actuators are used the high clamp forces and small travel for, for example, disc brakes can be readily achieved. However, in mechanical actuators, the actuator mechanism may comprise helical ramps and rollers, large pitch angle threads or two stage or double angled ramps and rollers. In turn the actuator may be operated by a lever connected to, for example, air cylinders, cables, linkages and handbrake levers. Generally these arrangements require low applying forces but have the disadvantage of requiring long operating strokes.

The aim of the present invention is to provide a mechanical actuator which has a relatively short operating stroke and requires a relatively low operating force.

According to the present invention there is provided an actuator mechanism for a vehicle brake, comprising an axially rotatable actuator shaft and an actuator member which, in use, can be moved to actuate a brake, the actuator shaft and actuator member being interconnected by an assembly which comprises a first fast thread and a second fast thread, said first thread having a greater pitch angle than said second thread and being arranged to, in use, move the actuator member to take up any slack to cause friction surfaces of a brake to interengage, said second thread being arranged to, in use, subsequently move the actuator member to apply the brake.

In operation an actuator constructed according to the present invention, provides a quick take-up arrangement in the form of said first fast thread whereby the clearance, for example, between friction pads and a disc would be taken up utilising only a small force, the second fast thread providing the required high clamping force at the friction pad/disc interface, still utilising only a small operating force.

In a preferred embodiment of the present invention rotation of the actuator shaft to operate the brake causes both a spring coiled around the shaft and a toothed disc fixedly mounted on the shaft, to rotate with the shaft. One end of the spring is keyed to the shaft and the other end of the spring is in abutment with a pin projecting from an annular member, the annular member being mounted coaxially with the actuator shaft and said pin extending parallel to the axis of the actuator shaft. The toothed disc is similarly connected by a pin abutment to the annular member, the outer periphery of said annular member threadedly engaging with an outer annular member fixed in a housing of the actuator. A driving connection is thus provided between the actuator shaft and said annular member by the coiled spring. However, it will be appreciated that frictional forces exist in the threaded connection between the annular member and outer annular member i.e. in the said first fast thread. Thus the spring has to be tensioned to overcome these frictional forces, before the driving connection can become operative. So that rotation of the actuator shaft causes virtually immediate movement of the annular member, the coiled spring is, during assembly of the actuator, prestressed to an extent almost sufficient to overcome the said frictional forces. Thus rotation of the actuator shaft causes said annular member to move axially of the shaft relative to said outer annular member by virtue of what is said first fast thread.

In the preferred embodiment of the present invention the coiled spring is maintained in a prestressed state by two pins which project from the annular member parallel to the actuator shaft, one pin engaging a tooth on the toothed disc and the other pin engaging the free end of the coiled spring. However, in an alternative embodiment a single pin fulfills both functions and is engaged between a tooth of the toothed disc and the free end of the pin.

Said annular member is keyed to said actuator member so that rotation of the actuator shaft can cause rotation and axial movement of said actuator member, the actuator member acting either on brake shoes or friction pads via an adjusting mechanism such as that described in our British Patent Specification No. 1,403,357. The actuator member is connected by said second fast thread to a further annular member which is axially slidably mounted on the actuator shaft but which is keyed to the shaft to prevent rotation relative thereto. In use rotation of the actuator shaft axially moves the actuator member by virtue of the first fast thread which is of such a pitch angle as to ensure a quick take up of the clearance between the friction pads and disc i.e. including any clearance at said adjusting mechanism. With all axial clearance taken up, reaction from the friction pads and disc causes the annular member of said second fast thread to press a non-rotatable clutch member against the annular member of the first fast thread to thus lock said first fast thread. The first fast thread is then stationary though the actuator shaft continues to rotate winding up the spring and rotating the annular member of the second fast thread.

Continued rotation of the second annular member which is urged by reaction forces onto a bearing disc contiguous with said clutch member, causes relative rotation between said second annular member and the actuator member resulting in axial movement of the actuator member, to thus apply the brakes. The pitch angle of the second fast thread is less than that of the first fast thread and is thus capable of applying a greater force than that of the first fast thread.

On releasing the actuator shaft the spring returns the threads to their initial positions, a Belleville washer ensuring no driving engagement at the clutch faces. The adjusting mechanism of our British Patent Specification No. 1,403,357 ensures that the actuator has substantially the same length of travel from brake operation at all times.

The advantages of the present invention are that the actuator might only require a relatively small actuating force while having a relatively short actuating stroke. The actuator of the present invention could thus obviate the present requirements for spring brakes presently used on commercial vehicles.

Figure 5:
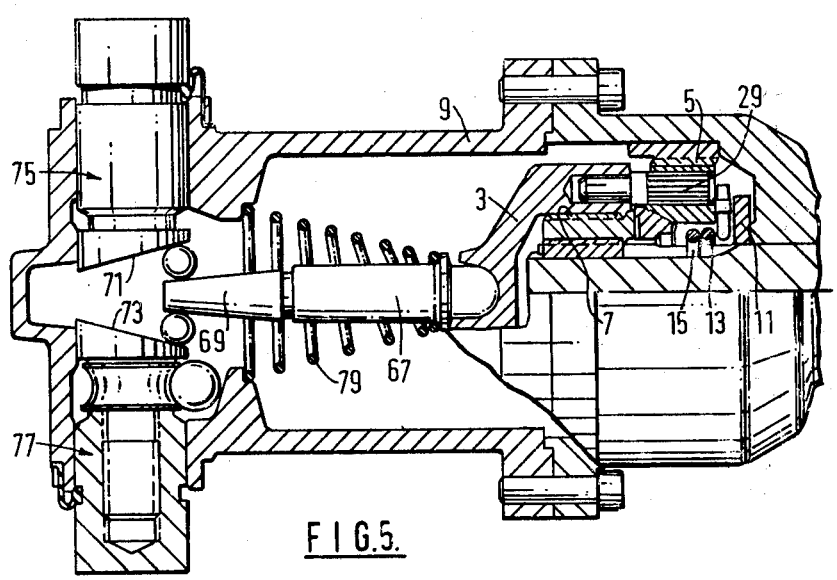
Figure 2:
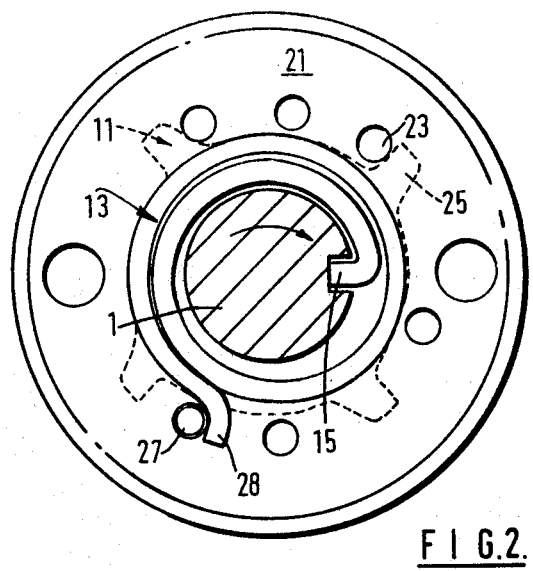
Figure 4:
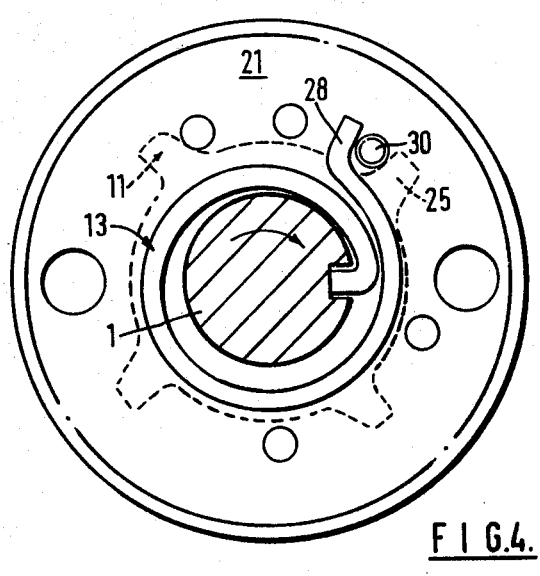
Figure 3:
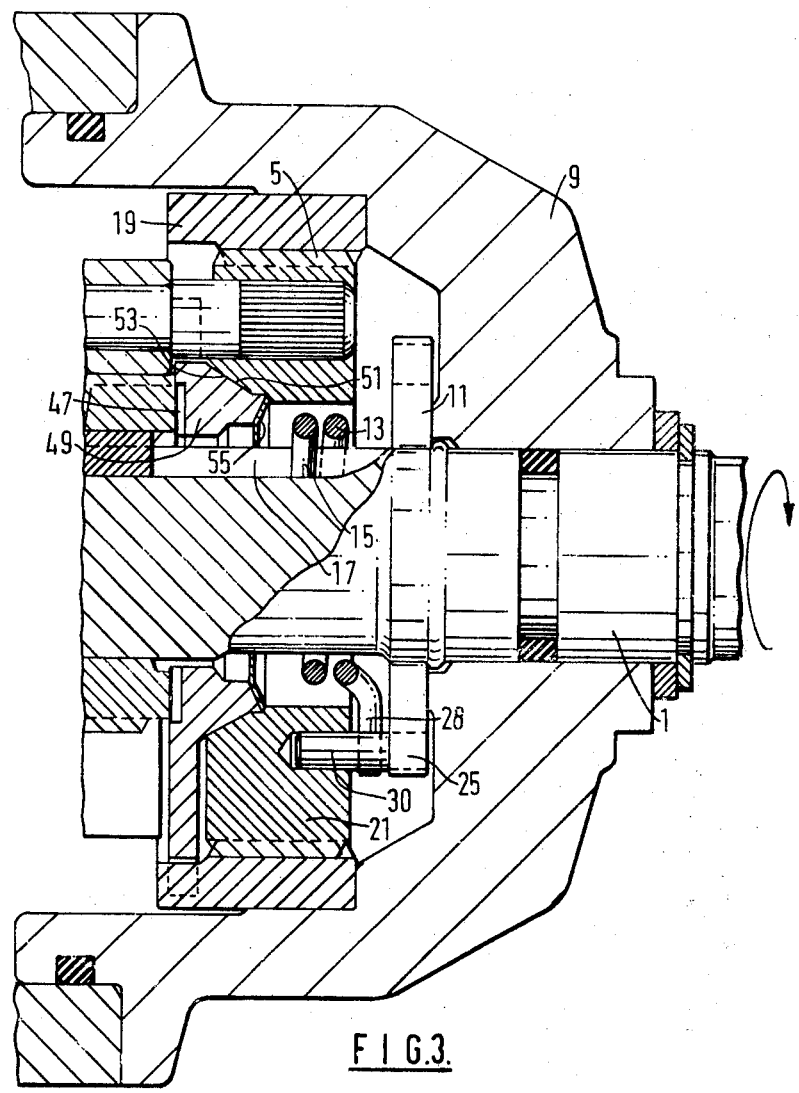

The present invention will now be further described, by way of example, with reference to the accompanying drawings, in which:

FIG. 1 is a longitudinal cross-sectional view of a preferred embodiment of the present invention, in a ready-for-use mode, FIG. 2 is a cross-sectional view taken along line I—I in FIG. 1, with the outline of the toothed disc superimposed, FIG. 3 is a longitudinal cross-sectional view of part of a modified form of the embodiment of FIG. 1, FIG. 4 is a cross-sectional view taken along line III—III in FIG. 3 with the outline of the toothed wheel superimposed; and FIG. 5 is a longitudinal cross-sectional view of an actuator of the present invention in a drum-brake installation.

The actuator of the present invention illustrated in FIGS. 1 and 2, is suitable for use in a disc brake. The actuator basically comprises an actuator shaft 1 and an actuator member 3, interconnected by an assembly which comprises a first fast thread generally designated 5 and a second fast thread generally designated 7. The first fast thread 5 has a greater pitch angle than second fast thread 7 for reasons discussed hereinafter.

Actuator shaft 1 is rotatably mounted in actuator housing 9 and a toothed disc 11 and a coiled spring 13 are located on the shaft 1. The toothed disc 11 is fixedly mounted on shaft 1 coaxially therewith and one end 15 of spring 13 is keyed into an axially extending groove 17 in shaft 1. The first fast thread 5 is provided on the inside surface of an annular outer member 19 which is fixed within housing 9 coaxially with shaft 1, the outer member 19 threadedly engaging annular member 21 which is provided with pin 23 which extends parallel to shaft 1 and can engage a tooth 25 of disc 11. A further pin 27 also projects from annular member 21 parallel to shaft 1, this further pin 27 engaging the free end 28 of coiled spring 13. Spring 13 thus provides a driving connection between actuator shaft 1 and annular member 21. To overcome frictional forces in first fast thread 5 so that rotational movement of actuator shaft 1 results in virtually immediate rotation of annular member 21, spring 13 is prestressed during assembly of the actuator to an extent almost sufficient to overcome the frictional forces in first fast thread 5. Pins 23 and 27 maintain coiled spring 13 in this prestressed state.

The outer annular member 21 is connected to actuator member 3 which is in the form of a sleeve which is arranged coaxially with shaft 1, the connection being by way of a pin 29 which is fixed in the annular member 21 and extends parallel to shaft 1, the pin 29 axially slidably engaging in a bore 31 in actuator member 3 so as to prevent relative rotation but allow relative axial movement between actuator member 3 and annular member 21. Inside sleeve-like actuator member 3 a further annular member 33 is mounted on shaft 1, coaxially with shaft 1, a key 35 engaging in groove 17 and being secured to the further annular member 33 to allow axial movement of the further annular member 33 relative to shaft 1, but to prevent rotation relative thereto. Second fast thread 7 is provided in the outer surface of further annular member 33 and the inside wall of actuator member 3. On the end 37 of shaft 1 a spring cup 39 is retained by a circlip 41, one end of a spring 43 engaging the spring cup 39 and the other end of the spring 43 engaging a shoulder 45 on the inside wall of actuator member 3. Spring 43 thus biasses actuator member 3 and second fast thread 7 to the ready-for-use position of FIG. 1. Further annular member 33 engages annular thrust bearing 47 which is located in a recess in annular clutch member 49, clutch member 49 being fixed against rotation and having a clutch surface 51 which, in use, engages clutch surface 53 provided on annular member 21. Clutch surfaces 51 and 53 are held normally in non-driving engagement by Belleville washer 55.

Also provided on actuator member 3 is an adjusting mechanism generally designated 57 which is not essential to this invention and which is therefore only described and referred to hereinafter, in brief. This adjusting mechanism 57 is as described in our British Patent Specification No. 1,403,357 and basically comprises a clutch surface 59 on actuator member 3, which can engage a clutch surface 61 on a member 63 which is screw threadedly mounted on a shaft 65 which, in use, is secured to an actuator piston (not shown), which piston engages a friction pad assembly (not shown) of a disc brake.

From the unactuated position of FIG. 1, rotation of actuator shaft 1 causes spring 15 to rotate resulting in the rotation of annular member 21, annular member 21 by virtue of first fast thread 5 moving to the left in FIG. 1. Thus actuator member 3 moves to the left in FIG. 1 taking up the clearance between clutch faces 59 and 61 (see FIG. 3) and causing shaft 65 to move axially and cause an actuator piston (not shown) to engage the friction pad assembly (not shown) with the disc (not shown). Fast thread 5 is of a suitable pitch angle to ensure the quick take up of the clearances. However this thread cannot cater for the application of the required load for braking. Continued rotation of shaft 1 causes tooth 25 of disc 11 to lift from pin 23 and spring 13 to wind up allowing annular member 33 to rotate relative to actuator member 3 and press clutch faces 51 and 53 together via thrust bearing 47, locking annular member 21 in position relative to outer annular member 19. Second fast thread 7 is of a pitch angle which can apply braking load and further rotation of shaft 1 causes actuator member 3 to move to the left in FIG. 1—see FIG. 5, along pin 29 to thus apply the brake.

Upon release of the actuation force to shaft 1, spring 43 moves actuator member 3 on second fast thread 7 to release the brake, adjusting mechanism 57 ensuring that subsequent actuation requires only the same length of stroke. Also Belleville washer 55 separates clutch faces 51 and 53 and allows spring 11 to unwind to its initial prestressed position, returning the first fast thread 5 to its initial position.

Thus in this embodiment first fast thread 5 takes up the clearance quickly and second fast thread 7 applies the required braking force.

The embodiment of the present invention illustrated in FIGS. 3 and 4 is basically the same as the embodiment of FIGS. 1 and 2 and the same reference numerals have been used for like parts. The sole difference lies in the connection between the spring 13, annular member 21 and toothed disc 11. As will be appreciated from the above description of the embodiment of FIGS. 1 and 2 it is necessary for spring 13 to be initially prestressed and spring 13 is in FIGS. 1 and 2, maintained in this state by pins 23 and 27. In the embodiment of FIGS. 3 and 4, one pin 30 projects from the annular member 21 parallel to shaft 1 and completes the function of both pin 23 and pin 27 in the embodiment of FIGS. 1 and 2. Pin 30 engages between tooth 25 on disc 11 and the free end 28 of coiled spring 13.

Whilst the embodiments of FIGS. 1 and 2, and FIGS. 3 and 4, are designed for a disc brake, the present invention is equally applicable to the mechanical actuation of a shoe drum brake and such an application is illustrated in FIG. 5. Parts in FIG. 6 equivalent to parts in FIGS. 1 to 4 have been identified by the same reference numerals.

In the embodiment of FIG. 5, the actuator member 3 acts on a dolly 67, adjusting mechanism 57 having been omitted. Dolly 67 has a tapered end 69 which engages between conical surfaces 71 and 73 of brake shoe abutments 75 and 77 respectively. The remainder of the actuator is constructed and operates basically as per the description of FIGS. 1 to 4. Thus rotation of actuator shaft 1 causes dolly 67 to move abutments 75 and 77 to force the brake shoes (not shown) against the drum (not shown). On releasing shaft 1, spring 79 which replaces spring 43 of FIGS. 1 to 5, causes actuator member 3 to move to release the brake shoes.

Thus it will be appreciated that the present invention provides a mechanical actuator for disc or drum brakes, which has the advantageous short actuating stroke and low required actuating force.

I claim:

1. An actuator mechanism for a vehicle brake, comprising an axially rotatable actuator shaft and an actuator member which, in use, can be moved to actuate a brake, the actuator shaft and actuator member being interconnected by an assembly which comprises a first fast thread and a second fast thread, said first thread having a greater pitch angle than said second thread and having an operative connection with said actuator member to, in use, move the actuator member to take up any slack until friction surfaces of a brake interengage, said second thread having an operative connection with said actuator member to, in use, subsequently move the actuator member to apply the brake, a spring being coiled around the actuator shaft, one end of the spring being keyed to the shaft and the other end of the spring abutting a projection from an annular member, the annular member being mounted coaxially with the actuator shaft, a toothed disc mounted coaxially and non-rotatably on said actuator shaft being connected by a pin abutment to the annular member, the outer periphery of said annular member engaging with a fixed outer annular member by said first fast thread.

2. An actuator mechanism according to claim 1, wherein the spring is pretensioned so that rotation of the actuator shaft causes the said annular member to rotate virtually immediately.

3. An actuator mechanism according to claim 1 or 2, wherein said other end of the spring abuts a further pin abutment projecting from the said annular member.

4. An actuator mechanism as claimed in claim 1 or 2, in which said other end of the spring abuts the same pin abutment as said toothed disc.

5. An actuator mechanism according to claim 1, in which a second annular member of said second fast thread is located coaxially with said actuator shaft and arranged to press a non-rotatable clutch member against the annular member of said first fast thread to thus lock said first fast thread when, in use, the first fast thread has moved the brake friction surfaces into interengagement further rotation of the actuator shaft winding up the spring and rotating said further annular member of said second fast thread.

6. An actuator mechanism according to claim 5, wherein a bearing disc is located between said clutch member and said annular member of said second fast thread.

7. An actuator mechanism according to claim 5 or claim 6, wherein the said clutch member and said annular member are biassed apart by further spring means.

8. An actuator mechanism as claimed in claim 5 or 6, in which said second annular member is keyed to the actuator shaft but is axially slidable relative thereto, the periphery of the second annular member being threadedly engaged with said actuator member by said second fast thread, and said actuator member being only axially movable.

9. An actuator mechanism according to claim 8, wherein said actuator member is spring biassed against such axial movement.

10. An actuator mechanism according to claim 1, wherein the actuator member is connected to a conventional adjusting mechanism via which the actuator member can, in use, act either on friction pads or brake shoes.

* * * * *